(12) United States Patent
Huang et al.

(10) Patent No.: US 9,304,057 B2
(45) Date of Patent: Apr. 5, 2016

(54) DEVICE AND METHOD FOR TESTING RIGIDITY AND NON-LINEAR RELATIONSHIP OF COUPLING INTERFACE FOR CYLINDRICAL FITTING

(75) Inventors: Yumei Huang, Shaanxi (CN); Yao Liu, Shaanxi (CN); Ye Hui, Shaanxi (CN); Guangpeng Zhang, Shaanxi (CN); Chuang Gao, Shaanxi (CN)

(73) Assignee: XI'AN UNIVERSITY OF TECHNOLOGY, Xi'an Shaanxi (CN)

( * ) Notice: Subject to any disclaimer, the term of this patent is extended or adjusted under 35 U.S.C. 154(b) by 286 days.

(21) Appl. No.: 14/237,336

(22) PCT Filed: Oct. 27, 2011

(86) PCT No.: PCT/CN2011/081451
§ 371 (c)(1),
(2), (4) Date: Apr. 7, 2014

(87) PCT Pub. No.: WO2013/020328
PCT Pub. Date: Feb. 14, 2013

(65) Prior Publication Data
US 2015/0300910 A1    Oct. 22, 2015

(30) Foreign Application Priority Data
Aug. 9, 2011 (CN) .......................... 2011 1 0224330

(51) Int. Cl.
*G01M 5/00*    (2006.01)
(52) U.S. Cl.
CPC .................................. *G01M 5/0075* (2013.01)
(58) Field of Classification Search
CPC ......... G01N 3/04; G01N 3/02; G01M 5/0041; G01M 5/0075; G01M 5/005
USPC .......................................................... 73/794
See application file for complete search history.

(56) References Cited

U.S. PATENT DOCUMENTS 5,127,271 A * 7/1992 Sato .......................... G01N 3/20
73/852
6,145,370 A * 11/2000 Evans ..................... G01N 19/02
73/7

(Continued)

FOREIGN PATENT DOCUMENTS

CN    101701868    5/2010
CN    101865766    10/2010

(Continued)

OTHER PUBLICATIONS

International Search Report for PCT/CN2011/081451, English translation attached to original, Both completed by the Chinese Patent Office on Apr. 12, 2012, All together 8 Pages.

*Primary Examiner* — Freddie Kirkland, III
(74) *Attorney, Agent, or Firm* — Brooks Kushman P.C.

(57) ABSTRACT

A device and a method for testing the rigidity and non-linear relationship of the coupling interface for cylindrical fitting including an axial loading assembly which is provided along a horizontal central line within a side wall of a frame test bench and contacting with the test-piece shaft via a steel ball, a radial loading assembly downward provided along a vertical central line of top board of the frame test bench, a tip of a perpendicular loading part of the radial loading assembly extending into the outer housing of the test-piece housing fixed on an upper plane of a bottom wall of the frame test bench, with the test-piece shaft and the test-piece housing fitted and connected to each other via a coupling interface for cylindrical fitting; a plurality of displacement sensors fixed on the test-piece housing, and test heads of respective displacement sensor assembly aiming at the test-piece shaft.

10 Claims, 2 Drawing Sheets

(56) References Cited

U.S. PATENT DOCUMENTS

| | | | |
|---|---|---|---|
| 6,526,837 B1 * | 3/2003 | Grote | G01N 3/04 73/856 |
| 7,426,871 B2 * | 9/2008 | Saves-Saint-Germes | G01M 5/005 73/802 |
| 7,568,397 B2 * | 8/2009 | Merendino, Sr. | G01N 3/04 73/818 |
| 8,096,191 B2 * | 1/2012 | Ladani | G01L 1/14 73/780 |
| 9,016,986 B2 * | 4/2015 | Huang | B23F 23/12 409/25 |
| 9,121,799 B2 * | 9/2015 | Huang | G01M 99/007 |

FOREIGN PATENT DOCUMENTS

| | | |
|---|---|---|
| CN | 201600242 | 10/2010 |
| CN | 101893512 | 11/2010 |
| CN | 201876396 | 6/2011 |
| CN | 102147320 | 8/2011 |

* cited by examiner

DEVICE AND METHOD FOR TESTING RIGIDITY AND NON-LINEAR RELATIONSHIP OF COUPLING INTERFACE FOR CYLINDRICAL FITTING

CROSS-REFERENCE TO RELATED APPLICATION

This application is the U.S. national phase of PCT Application No. PCT/CN2011/081451 filed on Oct. 27, 2011, which claims priority to Chinese Patent Application No. 201110224330.5 filed on Aug. 9, 2011, the disclosures of which are incorporated in their entirety by reference herein.

TECHNICAL FIELD

The present disclosure belong to the technical field of coupling interface of mechanical structure, specifically, it relates to a device for testing rigidity and non-linear relationship of coupling interface for cylindrical fitting, and a method for testing rigidity and non-linear relationship of coupling interface for cylindrical fitting.

BACKGROUND ART

A surface where a shaft and a hole having the same nominal diameter contact with each other is a coupling interface for cylindrical fitting, hereinafter referred to as the coupling interface for cylindrical fitting. The coupling interface for cylindrical fitting is classified into two categories, i.e., fixed coupling interfaces for cylindrical fitting (for example, a press fitting of a shaft and a hole) and motional coupling interfaces for cylindrical fitting, wherein the motional coupling interfaces for cylindrical fitting are further classified into slewing motional coupling interfaces for cylindrical fitting (for example, the slewing motional coupling interface for cylindrical fitting between a shaft and a hole of a slewing and sliding bearing) and rectilinear motional coupling interfaces for cylindrical fitting (for example, the rectilinear motional coupling interface for cylindrical fitting between a cylinder and a piston).

At present, the rigidity of the coupling interface for cylindrical fitting is generally obtained through analytic method, and the reliability of the analytic method and an analyzed result should be verified via tests, however, since the coupling surfaces for cylindrical fitting exist in a test system, and the rigidity thereof is non-linear, the requirements on method and device for the tests are very strict, the loading and testing method thereof should ensure the implementation of the expected model, the characteristics of the coupling interface for cylindrical fitting as the tested object need to be separated from the characteristics of the test system, so as to ensure the accuracy of the test. Thus the rigidity test related to such coupling interface is greatly limited due to complicated method and apparatus structure and high cost.

SUMMARY

The present disclosure aims to provide a device for testing the rigidity and non-linear relationship of a coupling interface for cylindrical fitting so as to overcome the problems in prior arts, i.e., the characteristics of the coupling interface for cylindrical fitting as the tested object cannot be totally separated from the characteristics of the test system, and great limitation of the test device caused by complicated apparatus structure and high cost.

The present disclosure aims to further provide a method for testing the rigidity and non-linear relationship of the coupling interface for cylindrical fitting.

The present disclosure provides a device for testing the rigidity and non-linear relationship of a coupling interface for cylindrical fitting comprising: a frame test bench, an axial loading assembly installed along a horizontal centerline within the side walls of the frame test bench, with the axial loading assembly being in contact with one end of a test-piece shaft via a steel ball, a radial loading assembly installed onto the top plate of the frame test bench and facing downwards along the vertical centerline thereof, with a tip of a perpendicular loading part of the radial loading assembly extending into an outer housing vertical hole of a test-piece housing, an upper plane of the bottom wall of the frame test bench is used for fixing the test-piece housing for test, a test-piece shaft is fitted and connected to the test-piece housing via a coupling interface for cylindrical fitting; installing brackets of displacement sensors a1, a2, b1, b2, c1, c2, c3, and c4 are fixed on the test-piece housing, wherein each installing bracket is provided with displacement sensors a1, a2, b1, b2, c1, c2, c3, and c4, respectively, and test heads of respective displacement sensors aim at the test-piece shaft.

The present disclosure further provides a method for testing radial rigidity and non-linear relationship using the above test device. A set of device is used, the device comprising a frame test bench, an axial loading assembly installed along a horizontal centerline within the side walls of the frame test bench, with the axial loading assembly being in contact with one end of a test-piece shaft via a steel ball, a radial loading assembly installed onto the top plate of the frame test bench and facing downwards along the vertical centerline thereof, with a tip of a perpendicular loading part of the radial loading assembly extending into an outer housing vertical hole of a test-piece housing; The installing brackets of displacement sensors a1, a2, b1, b2, c1, c2, c3, and c4 are fixed on the test-piece housing, wherein each installing bracket is provided with displacement sensors 1, a2, b1, b2, c1, c2, c3, and c4, respectively, and test heads of respective displacement sensors aiming at the test-piece shaft.

The structure of the axial loading assembly is being disposed along the horizontal direction, and comprising a flange sleeve, a flange plate of the flange sleeve is fixed and withheld on an outer wall at one side of the frame test bench, a cylinder body of the flange sleeve extends within a side wall of the frame test bench, a loading screw is connected to the axis center of the flange sleeve via threads, a check ring is provide on a rod of the loading screw extending within the cylinder body of the flange sleeve, a thrust bearing and a radial bearing are disposed on the loading screw at both sides of the check ring, a nut is disposed on the loading screw at one side of the radial bearing, wherein ports of the check ring and the sleeve are fixedly connected to each other, the sleeve is successively cup jointed with a connector, a force sensor, and a horizontal loading part, and the horizontal loading part contacts the test-piece shaft via a steel ball.

The structure of the radial loading assembly is comprising a perpendicular loading part over which a force sensor, a connector, and a sleeve are successively provided, the force sensor and the connector are fixedly connected to each other via a screw, a lower port of the sleeve is muff-pressed on an upper surface of the connector, a check ring is fixedly connected to an upper port of the sleeve, the cylinder body of a flange sleeve cases around an outer surface of the sleeve, the flange plate at the upper end of the flange sleeve is hung at the upper plane of the upper wall of the frame test bench, a loading screw is installed along the axle center of the flange plate of the flange sleeve, the loading screw is connected to the flange plate of the flange sleeve via threads, the loading screw passes the check ring downward, a thrust bearing and a radial bearing are installed on the loading screw at both sides of the check ring, respectively, and a nut is disposed at the tip of the loading screw at one side of the radial bearing.

The technical solution is implemented as per the following steps:

a) adjusting an action line of radial load $F_Y$ and a Z axis of the coupling interface for cylindrical fitting to make them orthogonal to each other, and to make an action point of the radial load $F_Y$ to be at the Z-direction midpoint of the coupling interface for cylindrical fitting, and $l_1=l_2=L/2$, i.e., the offset of the coupling interface e=0, performing monitoring on the adjustment using the displacement sensors a1, a2, b1, and b2, so as to make the reading value changes of the displacement sensors a1 and a2 consistent with each other, i.e., $\delta a1 \approx \delta a2$, the reading value changes of b1 and b2 to be zero, i.e., $\delta b1 \approx 0$, $\delta b2 \approx 0$, meanwhile, the force sensor monitors other component forces of the force sensor to ensure that these component forces are approximate to zero, remaining only a component force along the axial direction of the force sensor, so as to ensure that only the radial force $F_Y$ is active, b) disposing the displacement sensors a1 and a2 as symmetrical to each other with respect to the Z direction midpoint of the cylindrical hole of the test-piece housing, symmetrically installing brackets of the displacement sensors a1 and a2 on the test-piece housing and making the installing points close to the test-piece shaft, so as to reduce the influence on the test result caused by the deformation the test-piece shaft and the test-piece housing, at the same time, calculating the deformation of the test-piece shaft and the test-piece housing using finite element, and deducting the influences from the test result, c) releasing the axial loading assembly, loading by using the radial loading assembly, rotating the loading screw to make it move downward slightly, such that the perpendicular loading part applies a radial load $F_Y$ to the test-piece shaft, measuring the radial load $F_Y$ by the force sensor, and measuring the radial relative displacements $\delta a1$ and $\delta a2$ between the test-piece shaft and the test-piece housing by the displacement sensors a1 and a2, assuming $\delta y=(\delta a1+\delta a2)/2$, then the radial rigidity $K_R$ can be calculated via the formula $K_R=F_Y/\delta y$.

The third technical solution of the present disclosure is a method for testing the radial rigidity and non-linear relationship using the above test device. A set of device is used, the device comprising a frame test bench, an axial loading assembly installed along the horizontal centerline within the side walls of the frame test bench, with the axial loading assembly being in contact with one end of a test-piece shaft via a steel ball, a radial loading assembly installed onto the top plate of the frame test bench and facing downwards along the vertical centerline thereof, with a tip of a perpendicular loading part of the radial loading assembly extending into an outer housing vertical hole of a test-piece housing;

Installing brackets of displacement sensors a1, a2, b1, b2, c1, c2, c3, and c4 are fixed on the test-piece housing, wherein respective installing bracket is provided with displacement sensors 1, a2, b1, b2, c1, c2, c3, and c4, respectively, and test heads of respective displacement sensors aim at the test-piece shaft.

The structure of the axial loading assembly is being disposed along the horizontal direction, and comprises a flange sleeve, a flange plate of the flange sleeve is fixed and withheld on an outer wall at one side of the frame test bench, a cylinder body of the flange sleeve extends within a side wall of the frame test bench, a loading screw is connected to the axle center of the flange sleeve via threads, a check ring is disposed on a rod of the loading screw extending within the cylinder body of the flange sleeve, a thrust bearing and a radial bearing are disposed on the loading screw at both sides of the check ring, a nut is disposed on the loading screw at one side of the radial bearing, wherein ports of the check ring and the sleeve are fixedly connected to each other, the sleeve is successively cup jointed with a connector, a force sensor and a horizontal loading part, and the horizontal loading part contacts the test-piece shaft via a steel ball.

The structure of the radial loading assembly is comprising a perpendicular loading part over which a force sensor, a connector and a sleeve are successively provided, the force sensor and the connector are fixedly connected to each other via a screw, a lower port of the sleeve is muff-pressed on an upper surface of the connector, a check ring is fixedly connected to an upper port of the sleeve, the cylinder body of the flange sleeve cases around an outer surface of the sleeve, the flange plate at the upper end of the flange sleeve is hung on the upper plane of the upper wall of the frame test bench, a loading screw is installed along the axle center of the flange plate of the flange sleeve, the loading screw is connected to the flange plate of the flange sleeve via threads, the loading screw passes the check ring downward, a thrust bearing and a radial bearing are installed on the loading screw at both sides of the check ring, respectively, and a nut is disposed at the tip of the loading screw at one side of the radial bearing.

The technical solution is implemented as per the following steps:

a) adjusting an action line of radial load $F_Y$ and a Z axis of the coupling interface for cylindrical fitting to make them orthogonal to each other, and to make an action point of radial load $F_Y$ to be at the Z-direction midpoint of the coupling interface for cylindrical fitting, and $l_1=l_2=L/2$, i.e., the offset of the coupling interface e=0, performing monitoring on the adjustment using the displacement sensors a1, a2, b1, and b2, so as to make the reading value changes of the displacement sensors a1 and a2 consistent with each other, i.e., $\delta a1 \approx \delta a2$, the reading value changes of b1 and b2 to be zero, i.e., $\delta b1 \approx 0$, $\delta b2 \approx 0$, meanwhile, the force sensor monitors other component forces of the force sensor to ensure that the component forces are approximate to zero, except a component force along the axial direction of the force sensor, so as to ensure that only the radial force $F_Y$ is active, b) disposing the displacement sensors c1, c2, c3, and c4 as symmetrical to each other with respect to the axis of the coupling interface for cylindrical fitting, monitoring the adjustment to allow the action line of the axial load $F_z$ to coincide with the Z-axis of the coupling interface of the cylindrical fitting, monitoring the adjustment till $\delta c_1 \approx \delta c_2 \approx \delta c_3 \approx \delta c_4$, at the same time, the force sensor monitoring other component forces to be approximate to zero, remaining only the component force along the axial direction, symmetrically installing brackets of respective displacement sensors on the test-piece housing and making the installing points close to the test-piece shaft, so as to reduce the influence on the test result caused by the deformation the test-piece shaft and the test-piece housing, calculating the deformation of the test-piece shaft and the test-piece housing using finite element, and deducting the influences from the test result, c) at first, using the radial loading assembly, rotating the loading screw in the radial loading assembly to make it move right slightly, such that the perpendicular loading part applies the radial force $F_Y$ to the test-piece shaft, measuring the radial load $F_Y$ by using the force sensor, then using the axial loading assembly, rotating the loading screw in the axial loading assembly to make it move right slightly, such that the horizontal loading part applies the axial force $F_z$ to the test-piece shaft, measuring the axial load $F_z$ by using the force sensor, and measuring the relative displacements $\delta c1$, $\delta c2$, $\delta c3$, and $\delta c4$ between the test-piece shaft and the test-piece housing by using the displacement sensors c1, c2, c3, and c4, assuming $\delta Z=(\delta c1+\delta c2+\delta c3+\delta c4)/4$, then obtaining the axial rigidity under the condition of radial load $K_A$ via the formula $K_A=F_Z/\delta_Z$.

The fourth technical solution of the present disclosure is a method for testing an inclined rigidity and non-linear relationship using the above test device. A set of device is used, the device comprising a frame test bench, an axial loading assembly installed along the horizontal centerline within the side walls of the frame test bench, with the axial loading assembly being in contact with one end of a test-piece shaft via a steel ball, a radial loading assembly installed onto the top plate of the frame test bench and facing downwards along the vertical centerline thereof, with a tip of a perpendicular loading part of the radial loading assembly extending into an outer housing vertical hole of a test-piece housing, installing brackets of displacement sensors a1, a2, b1, b2, c1, c2, c3, and c4 being fixed on the test-piece housing, wherein respective installing bracket is provided with displacement sensors 1, a2, b1, b2, c1, c2, c3, and c4, respectively, and test heads of respective displacement sensors aiming at the test-piece shaft.

The structure of the axial loading assembly is being disposed along the horizontal direction and comprises a flange sleeve, a flange plate of the flange sleeve is fixed and withheld on an outer wall at one side of the frame test bench, a cylinder body of the flange sleeve extends within a side wall of the frame test bench, a loading screw is connected to the axle center of the flange sleeve via threads, a check ring is disposed on a rod of the loading screw extending within the cylinder body of the flange sleeve, a thrust bearing and a radial bearing are disposed on the loading screw at both sides of the check ring, a nut is disposed on the loading screw at one side of the radial bearing, wherein ports of the check ring and the sleeve are fixedly connected to each other, the sleeve is successively cup jointed with a connector, a force sensor, and a horizontal loading part, and the horizontal loading part contacts the test-piece shaft via a steel ball.

The structure of the radial loading assembly is comprising a perpendicular loading part over which a force sensor, a connector, and a sleeve are successively provided, the force sensor and the connector are fixedly connected to each other via a screw, a lower port of the sleeve is muff-pressed on an upper surface of the connector, a check ring is fixedly connected to an upper port of the sleeve, the cylinder body of the flange sleeve cases around an outer surface of the sleeve, the flange plate at the upper end of the flange sleeve is hung on the upper plane of the upper wall of the frame test bench, a loading screw is installed along the axle center of the flange plate of the flange sleeve, the loading screw is connected to the flange plate of the flange sleeve via threads, the loading screw passes the check ring downward, a thrust bearing and a radial bearing are installed on the loading screw at both sides of the check ring, respectively, and a nut is disposed at the tip of the loading screw at one side of the radial bearing.

The technical solution is implemented as per the following steps:

a) adjusting an action line of the radial load $F_Y$ and a Z axis of the coupling interface for cylindrical fitting to make them orthogonal to each other and adjusting the action line to offset from the Z-direction midpoint by a distance e of the coupling interface for cylindrical fitting, the offset of the coupling interface $e \neq 0$, $l_1 \neq l_2$; b) disposing the displacement sensors a1 and a2 as symmetrical to each other with respect to the Z direction midpoint of the cylindrical hole of the test-piece housing, symmetrically installing brackets of the displacement sensors a1 and a2 on the test-piece housing and making the installing points close to the test-piece shaft, so as to reduce the influence on the test result caused by the deformation the test-piece shaft and the test-piece housing, at the same time, calculating the deformation of the test-piece shaft and the test-piece housing using finite element, and deducting the influences from the test result, c) releasing the axial loading assembly, loading by using the radial loading assembly, applying a radial load $F_Y$ to the test-piece shaft by the perpendicular loading part, measuring the radial load $F_Y$ by the force sensor, and measuring the radial relative displacements $\delta a1$ and $\delta a2$ between the test-piece shaft and the test-piece housing by the displacement sensors a1 and a2, then obtaining the inclined rigidity $K_1$ via the formula $K_1=M_X/\theta_X=F_Y e/((\delta a1-\delta a2)/2l)$.

The advantageous effect of the present disclosure is that the characteristics of the coupling interface for cylindrical fitting as the tested object can be completely separated from the characteristics of the test system, which meets the requirements of tests under various situations. Based on the present disclosure, one can carry out tests on radial rigidity, axial rigidity, and inclined rigidity of the coupling interface for cylindrical fitting; tests on non-linear relationship between the radial rigidity, the axial rigidity, and the inclined rigidity of the coupling interface for cylindrical fitting and the radial load; tests on the non-linear influences on the radial rigidity, the axial rigidity, and the inclined rigidity due to different processing methods and processing accuracy; and tests on non-linear influences on the radial rigidity, the axial rigidity, and the inclined rigidity due to the lubricating medium.

Figure 1:
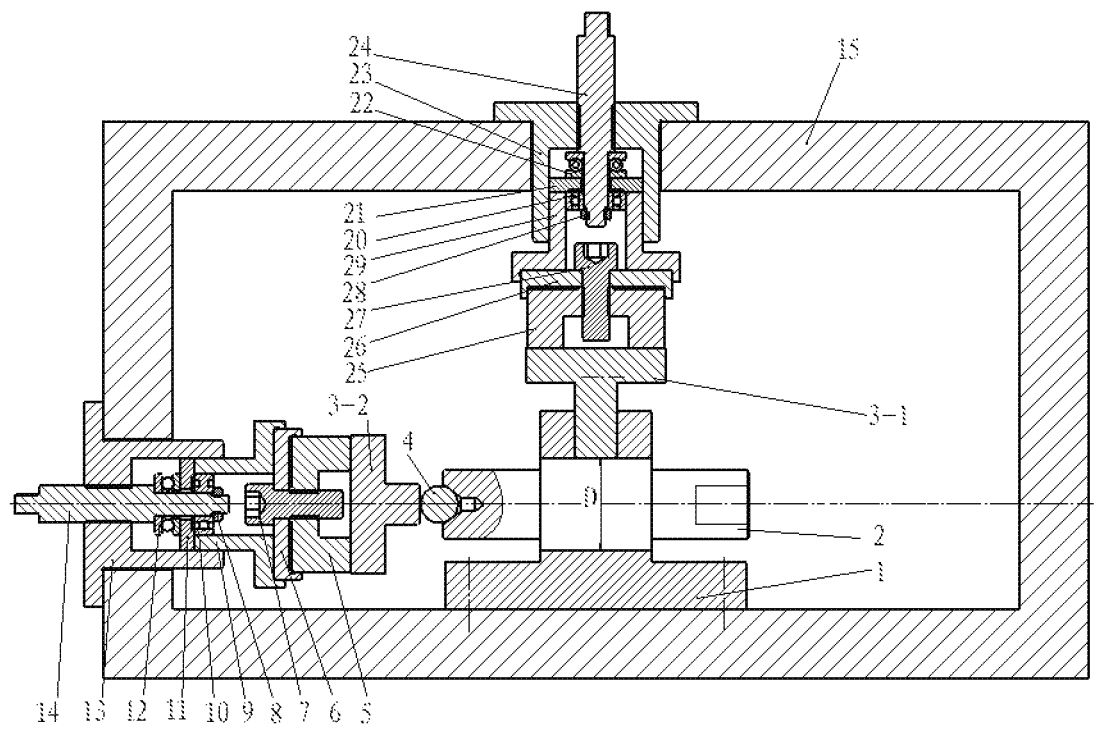
FIG. 1 is a structural diagram of the test device in the present disclosure.

In the drawings, the numbers indicate the components as follows: 1. test-piece housing, 2. test-piece shaft, 3-1. perpendicular loading part, 3-2. horizontal loading part, 4. steel ball, 5. force sensor, 6. connector, 7. bolt, 8. nut, 9. sleeve, 10. radial bearing, 11. check ring, 12. thrust bearing, 13. flange sleeve, 14. loading screw, 15. frame test bench, 20. radial bearing, 21. check ring, 22. thrust bearing, 23. flange sleeve, 24. loading screw, 25. force sensor, 26. connector, 27. bolt, 28. nut, 29. sleeve;

In addition, e indicates an offset of the coupling interface for cylindrical fitting, L indicates the length of the coupling interface for cylindrical fitting when e=0; a1, a2, b1, b2, c1, c2, c3, and c4 are displacement sensors, D indicates the nominal diameter of the coupling interface for cylindrical fitting.

DETAILED DESCRIPTION OF EXEMPLARY EMBODIMENTS

Below, the present disclosure will be explained in details by reference to the drawings and the exemplary embodiments.

As shown in FIG. 1, the structure of the test device in the present disclosure is that the test device comprises a frame test bench 15, an axial loading assembly is disposed along an horizontal centerline of the coupling interface for cylindrical fitting within the side walls of the frame test bench 15, the axial loading assembly is in contact with one end of a test-piece shaft 2 via a steel ball 4, a radial loading assembly is disposed onto the top plate of the frame test bench 15 and facing downwards along a vertical centerline thereof, with a tip of a perpendicular loading part 3-1 of the radial loading assembly extending into a vertical hole of a test-piece housing 1.

Referring to FIGS. 2-6, installation brackets of displacement sensors a1, a2, b1, b2, c1, c2, c3, and c4 are fixed on the test-piece housing 1, wherein respective installation bracket is provided with displacement sensors a1, a2, b1, b2, c1, c2, c3, and c4, respectively, and test heads of respective displacement sensors aim at the test-piece shaft 2. Respective brackets of displacement sensors are symmetrically installed on the test-piece housing 1, and the installation points are as close to the test-piece shaft 2 as possible.

The displacement sensors a1 and a2 therein are used for measuring the radial relative displacements of the test-piece shaft 2 with respect to the test-piece housing 1, and for monitoring an adjustment when radial rigidity and axial rigidity tests on the coupling interface for cylindrical fitting are carried out, such that the action line of the radial load $F_Y$ is perpendicular to the Z-axis of the coupling interface for cylindrical fitting, and the action point is at the Z-direction midpoint of the coupling interface for cylindrical fitting (monitoring the adjustment till $\delta a_1 \approx \delta a_2$).

The displacement sensors b1 and b2 therein are used for monitoring the adjustment when radial rigidity and axial rigidity tests on the coupling interface for cylindrical fitting are carried out, such that the action line of the radial load $F_Y$ is orthogonal to the Z-axis of the coupling interface for cylindrical fitting (monitoring the adjustment till $\delta b_1 \approx 0$ and $\delta b_2 \approx 0$).

The displacement sensors c1, c2, c3, and c4 therein are used for measuring the axial relative displacements of the test-piece shaft 2 with respect to the test-piece housing 1, and for monitoring the adjustment when the axial rigidity tests on the coupling interface for cylindrical fitting are carried out, such that the action line of the axial load $F_z$ coincides with the Z-axis of the coupling interface for cylindrical fitting (monitoring the adjustment till $\delta c_1 \approx \delta c_2 \approx \delta c_3 \approx \delta c_4$).

The force sensor 5 is a three-dimensional force sensor for measuring the axial load $F_z$ and for monitoring the adjustment when the axial rigidity tests on the coupling interface for cylindrical fitting are carried out, such that the action line of the axial load $F_z$ coincides with the Z-axis of the coupling interface for cylindrical fitting (monitoring the adjustment till other component forces of the force sensor 5 are approximate to zero, only the component force along the axial direction of the force sensor 5, i.e., the axial load $F_z$ of the coupling interface for cylindrical fitting exists).

The force sensor 25 is a three-dimensional force sensor for measuring the radial load $F_y$ and for monitoring the adjustment when the radial rigidity and axial rigidity tests on the coupling interface for cylindrical fitting are carried out, such that the action line of the radial load $F_Y$ is orthogonal to the Z-axis of the coupling interface for cylindrical fitting, and the action point is at the Z-direction midpoint of the coupling interface for cylindrical fitting (monitoring the adjustment till other component forces of the force sensor 25 are approximate to zero, only the component force along the radial direction of the force sensor 25, i.e., the radial load $F_y$ of the coupling interface for cylindrical fitting exists).

The radial loading assembly includes a perpendicular loading part 3-1 over which the force sensor 25, the connector 26, and the sleeve 29 are successively provided, the force sensor 25 and the connector 26 are fixedly connected to each other via a bolt 27, a lower port of the sleeve 29 is muff-coupled and pressed on an upper surface of the connector 26, the check ring 21 is fixedly connected to an upper port of the sleeve 29, the outer surface of the sleeve 29 is cased around by the cylinder body of a flange sleeve 23, the flange plate at the upper end of the flange sleeve 23 is fixed on the upper plane of the upper wall of the frame test bench 15, a loading screw 24 is installed along the axial center of the flange plate of the flange sleeve 23, the loading screw 24 is connected to the flange plate of the flange sleeve 23 via threads, the loading screw 24 passes the check ring 21 downward, a thrust bearing 22 and a radial bearing 20 are installed on the loading screw 24 at both sides of the check ring 21, respectively, and a nut 28 is disposed at the tip of the loading screw 24 at one side of the radial bearing 20.

An installing hole at the upper end of the thrust bearing 22 is fitted and cup-jointed with a shaft diameter of the loading screw 24, the upper end face of the thrust bearing 22 is compacted with a shaft shoulder of the loading screw 24, the lower end face of the thrust bearing 22 is compacted on the upper end face of the check ring 21, the outer diameter of the sleeve 29 fits the inner hole of the flange sleeve 23, a hole of the radial bearing 20 fits the shaft diameter at a lower portion of the loading screw 24, the outer diameter of the radial bearing 20 fits an inner hole of the sleeve 29, the upper end face of the outer ring of the radial shaft 20 is pressed on the lower end face of the check ring 21, the nut 28 is overlapped on the threads at the lower end of the loading screw 24, and pressed on the lower end face of the inner ring of the radial bearing 20, the outer diameter of the upper end of the connector 26 and the inner hole of the lower end step of the sleeve 29 fits each other and are fixedly connected to each other, the inner hole at the lower end of the connector 26 fits the outer diameter of the force sensor 25, the lower end of the force sensor 25 is fixedly connected to the perpendicular loading part 3-1, a round rod of the lower portion of the perpendicular loading part 3-1 passes the vertical hole of the test-piece housing 1 and pressed on the test-piece shaft 2.

The structure of the axial loading assembly is similar to that of the radial loading assembly, but it is along the horizontal direction. The axial loading assembly comprises a flange sleeve 13, a flange plate of the flange sleeve 13 fixed and withheld on an outer wall at one side (left side) of the frame test bench 15, a barrel of the flange sleeve 13 extending within a side wall of the frame test bench 15. A loading screw 14 is connected to the axle center of the flange sleeve 13 via threads, a check ring 11 is disposed around a rod of the loading screw 14 extending within the cylinder body of the flange sleeve 13. A thrust bearing 12 and a radial bearing 10 are disposed on the loading screw 14 at both sides of the check ring 11, and a nut 8 is disposed on the loading screw 14 at one side of the radial bearing 10, wherein ports of the check ring 11 and the sleeve 9 are fixedly connected to each other. The sleeve 9 is successively cup jointed with a connector 6, a force sensor 5, and a horizontal loading part 3-2, and the horizontal loading part 3-2 contacts the test-piece shaft 2 via a steel ball 4.

The installing hole at the left end of the thrust bearing 12 fits the shaft diameter in the middle portion of the loading screw 14, the left end face of the thrust bearing 12 and the shaft shoulder of the loading screw 14 are compacted to each other, the check ring 11 and the port of the sleeve 9 are fixedly connected, the right end face of the thrust bearing 12 is compacted to the left end face of the sleeve 9 via the check ring 11, the outer diameter of the sleeve 9 fits the inner hole of the cylinder body of the flange sleeve 12, the installing hole of the radial bearing 10 fits the shaft diameter of the right end of the loading screw 14, the outer diameter of the radial bearing 10 fits the inner hole of the sleeve 9, the left end face of the outer ring of the radial bearing 10 is pressed on the right end face of the check ring 11; the nut 8 is inserted on the threads at the right end of the loading screw 14, and is pressed on the right end face of the inner ring of the radial bearing 10; the outer diameter of the left end of the connector 6 fits and is fixedly connected to the inner hole of the boss of the sleeve 9, the inner hole at the right end of the connector 6 fits the outer diameter of the force sensor 5, the bolt 7 fixedly connects the connector 6 and the force sensor 5, the right end of the force sensor 5 is fixedly connected with the horizontal loading part 3-2, the horizontal loading part 3-2 is pressed on the steel ball 4, and the steel ball 4 is pressed within a central hole of the test-piece shaft 2.

The central axes of the loading screw, the flange sleeve, the sleeve, the check ring, the connector, the force sensors, and the loading parts of each loading assembly are in the same straight line. When a radial load is loaded on the coupling interface for cylindrical fitting between the test-piece shaft 2 and the housing 1, the radial straight line of the radial load and the central axis Z meet each other perpendicularly; when an axial load is loaded on the coupling interface for cylindrical fitting between the test-piece shaft 2 and the housing 1, the axial straight line of the axial load and the central axis Z are in the same straight line.

The method for testing the rigidity and non-linear relationship of the coupling interface for cylindrical fitting using the test device in the present disclosure may be implemented as per the following steps according to different situations:

Pre-installing the test components, as shown in FIG. 1, the test-piece shaft 2 is composed of a shaft body and two shaft heads, wherein the two shaft heads are at the two ends of the shaft body, respectively, and the central axis of the three portions are in the same straight line Z; the shaft body is provided within the horizontal through hole of the test-piece housing 1, and the two components are fitted and connected via a coupling interface for cylindrical fitting. The test-piece housing 1 is fixed on the upper plane of the bottom wall of the frame test bench 15, the test-piece shaft 2 and the test-piece housing 1 are fitted and connected via the coupling interface for cylindrical fitting; the test-piece shaft 2 upward contacts the radial loading assembly between the upper wall of the frame test bench 15 and the test-piece shaft 2, the test-piece shaft 2 contacts, towards the left, the axial loading assembly between the left side walls of the frame test bench 15 and the test-piece shaft 2 via the steel ball 4 pressed within the central hole of the test shaft 2.

1). Method for testing radial rigidity

Figure 2:
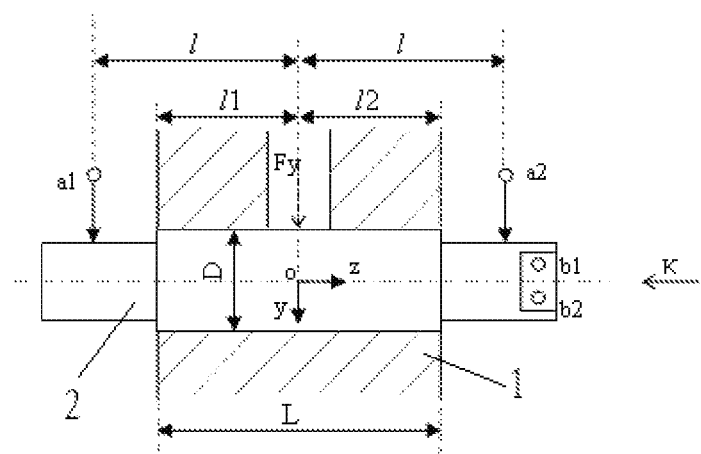
FIG. 2 is a principle schematic diagram of a radial status test carried out according to the test method in the present disclosure.
Figure 3:
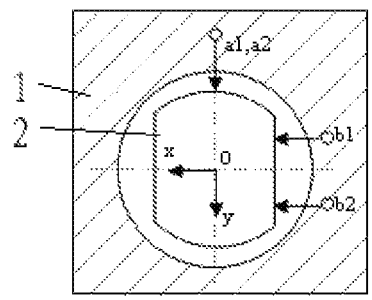
FIG. 3 is a K-direction view of FIG. 2.

Referring to FIGS. 1, 2, and 3, a loading is performed by using the radial loading assembly so as to measure the radial relative displacement $\delta y$ between the test-piece shaft 2 and the test-piece housing 1 generated due to the contact deformation of the coupling interface for cylindrical fitting under the action of the radial force $F_Y$, then the radial rigidity of the coupling interface for cylindrical fitting can be obtained through the expression $K_R=F_Y/\delta y$. The test method may be performed by adopting the following steps: ① disposing the displacement sensors a1 and a2 as symmetrical to each other with respect to the Z-direction midpoint of the cylindrical hole of the test-piece housing 1 (as shown in FIG. 2, the distances from the displacement sensors a1 and a2 to the Z-direction midpoint are both l), the brackets of the displacement sensors a1 and a2 are symmetrically installed on the test-piece housing 1. In order to make the measurement more accurate, the installing points of the displacement sensors a1 and a2 should be as close to the test-piece shaft 2 as possible, so as to reduce the influences on the test result due to the deformation of the test-piece shaft 2 and the test-piece housing 1, if there is high requirements on the measuring accuracy or the test-piece shaft 2 and the test-piece housing 1 are easily to deform, the deformation of the test-piece shaft 2 and the test-piece housing 1 may be calculated using finite element method at the same time, so as to deduct the influences from the test result; ② adjusting an action line of $F_Y$ such that the action line is orthogonal to a Z axis of the coupling interface for cylindrical fitting, and the action point of $F_Y$ is at the Z-direction midpoint of the coupling interface for cylindrical fitting (refer to FIG. 2, making $l_1=l_2=L/2$, i.e., the offset of the coupling interface e=0); performing monitoring on the adjustment using the displacement sensors a1, a2, b1, and b2 (refer to FIGS. 2 and 3), so as to make the reading value changes of the displacement sensors a1 and a2 consistent with each other, i.e., $\delta a1 \approx \delta a2$, the reading value changes of b1 and b2 are zero, i.e., $\delta b1 \approx 0$, $\delta b2 \approx 0$; meanwhile, monitoring the force sensor 25 such that the component forces of the force sensor 25 are approximate to zero except the component force along the axial direction of the force sensor 25, so as to ensure that only the radial force $F_Y$ is active; ③ releasing the axial loading assembly, loading by using the radial loading assembly, rotating the loading screw 24 to make it move downward slightly, such that the perpendicular loading part 3-1 applies a radial load $F_Y$ to the test-piece shaft 2, measuring the radial load $F_Y$ by using the force sensor 25, and measuring the radial relative displacements $\delta a1$ and $\delta a2$ between the test-piece shaft 2 and the test-piece housing 1 by using the displacement sensors a1 and a2, assuming $\delta y=(\delta a1+\delta a2)/2$, then calculating the rigidity $K_R$ via the formula $K_R=F_Y/\delta y$.

2). Method for testing axial rigidity

Figure 4:
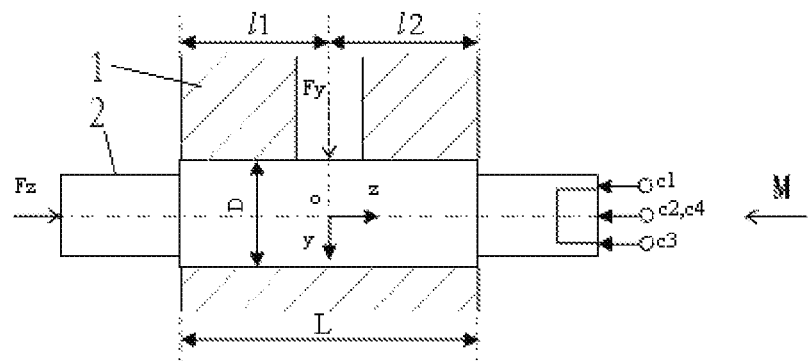
FIG. 4 is a principle schematic diagram of an axial status test carried out according to the test method in the present disclosure.
Figure 5:
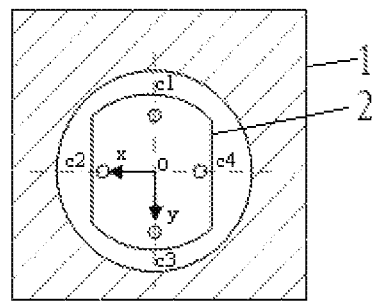
FIG. 5 is an M-direction view of FIG. 4.
Figure 6:
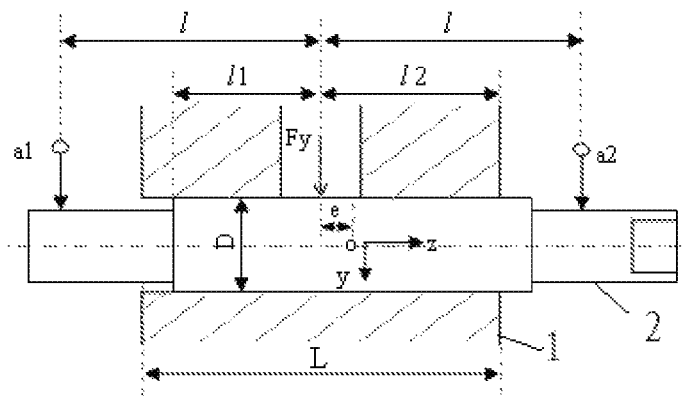
FIG. 6 is a principle schematic diagram of an inclined status test carried out according to the test method of the present disclosure.

Referring to FIGS. 1, 4, and 5, since the coupling interface for cylindrical fitting used for the tests can bear axial force only when a radial force exists, the axial loading assembly and the radial loading assembly are used at the same time, to apply the axial force $F_Z$ on condition that a certain radial force $F_Y$ is applied (macro displacement should be avoided); The axial relative displacement $\delta_Z$ between the test-piece shaft 2 and the test-piece housing 1 due to the contact deformation of the coupling interface for cylindrical fitting under the action of $F_Y$ and $F_Z$ is measured, thus the axial rigidity of the coupling interface for cylindrical fitting will be $K_A=F_Z/\delta_Z$, the specific test method is: ① adjusting an action line of radial load $F_Y$ and a Z axis of the coupling interface for cylindrical fitting to make them orthogonal to each other, and to make an action point of the radial load $F_Y$ to be at the Z-direction midpoint of the coupling interface for cylindrical fitting (as shown in FIG. 4, making $l_1=l_2=L/2$, i.e., the offset of the coupling interface e=0), the adjusting method herein is the same as that in the method for testing radial rigidity as described above, ② disposing the displacement sensors c1, c2, c3, and c4 as symmetrical to each other with respect to the axis of the coupling interface for cylindrical fitting (refer to FIGS. 4 and 5), monitoring and adjusting to allow the action line of the axial load $F_Z$ to coincide with the Z-axis of the coupling interface of the cylindrical fitting, (monitoring the adjustment till $\delta c_1 \approx \delta c_2 \approx \delta c_3 \approx \delta c_4$, at the same time, monitoring the force sensor to have to component forces to be approximate to zero, except the component force along the axial direction). In order to make the measurement more accurate, the brackets of respective displacement sensors should be installed on the test-piece housing 1 and the installing points should be as close to the test-piece shaft 2 as possible, so as to reduce the influences on the test result due to the contact deformation of the test-piece shaft 2 and the test-piece housing 1, if there is high requirements on the measuring accuracy or the test-piece shaft 2 and the test-piece housing 1 are easily to deform, the deformation of the test-piece shaft 2 and the test-piece housing 1 may be calculated using finite element method at the same time, so as to deduct the influences from the test result; ③ at first, using the radial loading assembly, rotating the loading screw 24 in the radial loading assembly to make it move downward slightly, such that the perpendicular loading part 3-1 applies the axial force $F_Y$ to the test-piece shaft 2, measuring the radial load $F_Y$ by using the force sensor 25, then using the axial loading assembly, rotating the loading screw 24 in the axial loading assembly to make it move right slightly, such that the horizontal loading part 3-2 applies the axial force $F_z$ to the test-piece shaft, measuring the axial load $F_z$ by the force sensor 5, and measuring the relative displacements $\delta c1$, $\delta c2$, $\delta c3$, and $\delta c4$ of the test-piece shaft 2 and the test-piece housing 1 by the displacement sensors c1, c2, c3, and c4, assuming $\delta Z=(\delta c1+\delta c2+\delta c3+\delta c4)/4$, then obtaining the axial rigidity $K_A$ under the condition of a certain axial load via the formula $K_A=F_z/\delta_Z$. The axial load and the axial relative displacement have linear relationship, if the axial load is changed, a test for verifying the linear relationship between the axial load and the axial relative displacement under the condition of a certain radial load may further be carried out.

3). Method for testing inclined rigidity

Performing loading using the radial loading assembly, applying a radial force $F_Y$ and making the action line thereof to be orthogonal to the Z-axis of the coupling interface for cylindrical fitting, whereas the action line offsets from the Z-direction midpoint of the coupling interface for cylindrical fitting, the offset of the coupling interface is e, and the moment $M_X$ generated by the radial force $F_Y$ meets the formula $M_X=F_Ye$, measuring the radial relative replacements $\delta a1$ and $\delta a2$ of the test-piece shaft 2 and the test-piece housing 1 generated due to the contact deformation of the coupling interface for cylindrical fitting under the action of the radial force $F_Y$, then a relative angular displacement $\theta_X=(\delta a1-\delta a2)/2l$, and the inclined rigidity of the coupling interface for cylindrical fitting $K_1=M_X/\theta_X$. The specific test method is: ① adjusting an action line of $F_Y$ and a Z axis of the coupling interface for cylindrical fitting to make them orthogonal to each other and to have the action line offset from the Z-direction midpoint e of the coupling interface for cylindrical fitting (refer to FIG. 6, the offset of the coupling interface $e \neq 0$, $l_1 \neq l_2$); ② the method for installing respective displacement sensors is the same as that in the method for testing the radial rigidity; c) releasing the axial loading assembly, loading by using the radial loading assembly, the perpendicular loading part applies a radial load $F_Y$ to the test-piece shaft 2, measuring the radial load $F_Y$ by the force sensor 25 measures, and measuring the radial relative displacements $\delta a1$ and $\delta a2$ of the test-piece shaft 2 and the test-piece housing 1 by the displacement sensors a1 and a2, then the inclined rigidity (also referred to as angular rigidity) $K_1$ can be calculated via the formula $K_1=M_X/\theta_X=F_Ye/((\delta a1-\delta a2)/2l)$.

4). Method for testing the non-linear relationship between the fit clearance and the rigidity of the coupling interface for cylindrical fitting Assuming that the actual diameters of the test-piece housing 1 and the test-piece shaft 2 are $D_1$ and $D_2$, respectively, replacing different test-piece housings 1 and test-piece shafts 2 to change the size of the fit clearance of $D_1$ and $D_2$, and tests on the non-linear relationships between different fit clearances such as positive clearance ($D_1>D_2$), zero clearance ($D_1=D_2$), and negative clearance ($D_1<D_2$), and etc. and the radial rigidity, axial rigidity, and inclined rigidity of the coupling interface for cylindrical fitting.

5). Method for testing the non-linear relationship between the radial load and the rigidity of the coupling interface for cylindrical fitting The radial load and the radial rigidity, the axial rigidity, and the inclined rigidity of the coupling interface for cylindrical fitting have non-linear relationship. When the radial force $F_Y$ is changed, tests on the non-linear relationship between the axial rigidity $K_R$ of the coupling interface for cylindrical fitting and the radial load $F_Y$ may be carried out; when the radial force $F_Y$ is changed, tests on the non-linear relationship between the axial rigidity $K_A$ of the coupling interface for cylindrical fitting and the radial load $F_Y$ may be carried out; and when the radial force $F_Y$ is changed, tests on the non-linear relationship between the inclined rigidity $K_1$ of the coupling interface for cylindrical fitting and the radial load $F_Y$ may be carried out.

6). Method for testing the influences on the non-linearity of the rigidity of the coupling interface for cylindrical fitting caused by the processing method and the accuracy If different test-piece housings 1 and test-piece shafts 2 of different processing methods and processing accuracy are replaced, tests on the non-linear influences on the radial rigidity, the axial rigidity, and the inclined rigidity of the coupling interface for cylindrical fitting caused by different processing methods and processing accuracy may be carried out.

7). Method for testing the influence on the non-linearity of the rigidity of the coupling interface for cylindrical fitting caused by the lubricating medium between the coupling interfaces for cylindrical fitting If the lubrication situations between the coupling interfaces for cylindrical fitting are changed, tests on the influence on the non-linearity of the radial rigidity, the axial rigidity, and the inclined rigidity of the coupling interface for cylindrical fitting caused by the lubricating medium may be carried out when there is no lubricating medium (dry), oil lubrication (using different types of lubricating oils, respectively), and grease lubrication.

In conclusion, the present test device, which may implement the above several types of rigidity tests under different situations, is easy to be widely used because of its high accuracy, high operation efficiency, and simple operation procedures.

What is claimed is:

1. A device for testing the rigidity and non-linear relationship of a coupling interface for cylindrical fitting, the device comprises a frame test bench, a radial loading assembly is provided below the top board of the frame test bench downward along the vertical centerline thereof, the radial loading assembly has a structure comprising a radial perpendicular loading part over which a first force sensor, a first connector, and a first sleeve are successively provided, the first force sensor and the first connector are fixedly connected to each other via a first bolt, a lower port of the first sleeve is cup-pressed on the upper surface of the first connector, a first check ring is fixedly connected to an upper port of the first sleeve, a cylinder body of a flange sleeve cases around the outer surface of the first sleeve, a flange plate at an upper end of the first flange sleeve is fixed on an upper plane of an upper wall of the frame test bench, a radial loading screw is installed along the axis of the flange plate of the first flange sleeve and is connected with the flange of the first flange sleeve through threads; the radial loading screw passes through the first check ring downward, a first thrust bearing and a first radial bearing respectively installed on the radial loading screw at both sides of the first check ring, a first nut is provided on a tip of the radial loading screw at one side of the first radial bearing, wherein a tip of the radial perpendicular loading part of the radial loading assembly extends into an outer housing vertical hole of a test-piece housing, and an upper plane of a bottom wall of the frame test bench is used for fixing the test-piece housing for test, a test-piece shaft is fitted and connected to the test-piece housing via the coupling interface for cylindrical fitting; radial displacement sensors a1, a2, b1, and b2 are fixed on the test-piece housing to measure a radial relative displacement of the test-piece shaft with respected to the test-piece housing.

2. The test device of claim 1, wherein the structure of the axial loading assembly is being provided in horizontal direction and comprises a second flange sleeve, a flange plate of the second flange sleeve is withheld and pressed on an outer wall at one side of the frame test bench, a cylinder body of the second flange sleeve extends into a side wall of the frame test bench, an axial loading screw is connected into the second flange sleeve via threads along the axis of the second flange sleeve, a second check ring is provided on the rod of the axial loading screw extending into the cylinder body of the second flange sleeve, a second thrust bearing and a second radial bearing are provided on the axial loading screws at both sides of the second check ring, a second nut is provided on the axial loading screw at one side of the second radial bearing, the second check ring is fixedly connected to a port of a second sleeve, the second sleeve is successively cup jointed with the a second connector, a second force sensor, and an axial horizontal loading part, the axial horizontal loading part contacting with the test-piece shaft via a steel ball, and axial displacement sensors c1, c2, c3, and c4 are fixed on the test-piece housing to measure an axial relative displacement of the test-piece shaft with respect to the test-piece housing.

3. The test device of claim 2, wherein the axial displacement sensors c1, c2, c3, and c4 are provided as symmetrical to each other with respect to the axis of the coupling interface for cylindrical fitting, the test heads thereof aiming at the test-piece shaft.

4. A method for performing axial rigidity and non-linear relationship tests using the test device of claim 2, comprising the steps of:

a) adjusting an action line of the radial load $F_Y$ and a Z axis of the coupling interface for cylindrical fitting to make them orthogonal to each other, and to make an action point of the radial load $F_Y$ to be at the Z-direction midpoint of the coupling interface for cylindrical fitting, performing monitoring on the adjustment using the displacement sensors a1, a2, b1, and b2, so as to make the reading value changes of the displacement sensors a1 and a2 consistent with each other, i.e., $\delta a1 \approx \delta a2$, and to make the reading value changes of b1 and b2 to be zero, i.e., $\delta b1 \approx 0$, $\delta b2 \approx 0$, meanwhile, monitoring the first force sensor, such that the component forces of the first force sensor are approximate to zero except a component force along the axial direction of the first force sensor, so as to ensure that only the radial force $F_Y$ is active;

b) disposing the displacement sensors c1, c2, c3, and c4 as symmetrical to each other with respect to the axis of the coupling interface for cylindrical fitting, monitoring the adjustment to allow the action line of the axial load $F_z$ to coincide with the Z-axis of the coupling interface of the cylindrical fitting, monitoring the adjustment till relative displacements $\delta c_1 \approx \delta c_2 \approx \delta c_3 \approx \delta c_4$, meanwhile, monitoring the second force sensor to ensure the component forces of the second force sensor to be approximate to zero except the component force along the axial direction; and c) using the radial loading assembly firstly, rotating the radial loading screw in the radial loading assembly to make it move right slightly, such that the first perpendicular loading part applies the radial force $F_Y$ to the test-piece shaft, measuring the radial load $F_Y$ by the first force sensor; then using the axial loading assembly, rotating the axial loading screw in the axial loading assembly to make it move right slightly, such that the horizontal loading part applies the axial force $F_z$ to the test-piece shaft, measuring the axial load $F_z$ by the second force sensor, and measuring the relative displacements $\delta c1$, $\delta c2$, $\delta c3$, and $\delta c4$ between the test-piece shaft and the test-piece housing by the displacement sensors c1, c2, c3, and c4, assuming $\delta Z=(\delta c1+\delta c2+\delta c3+\delta c4/4$, then obtaining the axial rigidity $K_A$ under the condition of radial load via the formula $K_A=F_z/\delta_Z$.

5. The test method of claim 4, wherein respectively changing conditions including the clearances of the coupling interface for cylindrical fitting of the test-piece shaft and the test-piece housing, different processing methods and processing accuracies, lubrication media and magnitudes of radial loads, and performing the steps a), b), and c), so as to perform tests on the non-linear relationships between the above conditions and the axial rigidity $K_A$ of the coupling interface for cylindrical fitting.

6. The test device of claim 1, wherein the radial displacement sensors a1 and a2 are installed on the installation brackets on the test-piece housing 1 as symmetrical to each other with respect to the central axis of the outer housing vertical hole of the test-piece housing, the radial displacement sensors b1 and b2 are installed on the test-piece housing 1 horizontally in parallel with the axis of the test-piece shaft 1, test heads of the displacement sensors a1, a2, b1, and b2 aiming at the test-piece shaft.

7. A method for performing radial rigidity and non-linear relationship tests using the test device of claim 1, comprising the steps of:

a) disposing the radial displacement sensors a1 and a2 as symmetrical to each other with respect to the central axis of the outer housing vertical hole of the test-piece housing;

b) adjusting an action line of the radial load $F_Y$ and a Z axis which is a center axis of the coupling interface for cylindrical fitting to make them orthogonal to each other, and to make an action point of the radial load $F_Y$ to be at the Z-direction midpoint of the coupling interface for cylindrical fitting, performing monitoring on the adjustment using the displacement sensors a1, a2, b1, and b2, so as to make the reading value changes of the displacement sensors a1 and a2 consistent with each other, i.e., $\delta a1 \approx \delta a2$, and to make the reading value changes of the displacement sensors b1 and b2 to be zero, i.e., $\delta b1 \approx 0$, $\delta b2 \approx 0$, meanwhile, monitoring the first force sensor, such that the component forces of the first force sensor are approximate to zero except a component force along the axial direction of the first force sensor, so as to ensure that only the radial force $F_Y$ is active; and c) releasing the axial loading assembly, loading by using the radial loading assembly, rotating the loading screw to make it move downward slightly, such that the radial perpendicular loading part applies a radial load $F_Y$ to the test-piece shaft, measuring the radial load $F_Y$ by the first force sensor, and measuring the radial relative displacements δa1 and δa2 between the test-piece shaft and the test-piece housing by the radial displacement sensors a1 and a2, assuming $δ_y=(δa1+δa2)/2$, then calculating the radial rigidity $K_R$ via the formula $K_R=F_Y/δy$.

8. The test method of claim 7, wherein respectively changing conditions such as the clearances of the coupling interface for cylindrical fitting of the test-piece shaft and the test-piece housing, different processing methods and processing accuracies, lubrication media and magnitudes of radial loads, and performing the steps a), b), and c), so as to perform tests on the non-linear relationships between the above conditions and the radial rigidity $K_R$ of the coupling interface for cylindrical fitting.

9. A method for performing inclined rigidity and non-linear relationship tests using the test device of claim 1, comprising the steps of:
   a) adjusting an action line of a radial load $F_Y$ and a Z axis of the coupling interface for cylindrical fitting to make them orthogonal to each other and adjusting the action line to offset from the Z-direction midpoint by a distance e of the coupling interface for cylindrical fitting;
   b) disposing the displacement sensors a1 and a2 as symmetrical to each other with respect to the Z direction midpoint of the cylindrical hole of the test-piece housing, the distance from the displacement sensors a1 and a2 to the Z-direction midpoint of the cylindrical hole of the test-piece housing is l; and
   c) releasing the axial loading assembly, loading by using the radial loading assembly, applying the radial load $F_Y$ to the test-piece shaft by the perpendicular loading part, measuring the radial load $F_Y$ by using the first force sensor, and measuring the radial relative displacements δa1 and δa2 between the test-piece shaft and the test-piece housing by using the displacement sensors a1 and a2, then calculating the inclined rigidity $K_1$ via the formula $K_I=M_X/θ_X=F_Ye/((δa1-δa2)/2l)$.

10. The test method of claim 9, wherein respectively changing conditions including the clearances of the coupling interface for cylindrical fitting of the test-piece shaft and the test-piece housing, different processing methods and processing accuracies, lubrication media and magnitudes of radial loads, and performing the steps a), b), and c), so as to perform tests on the non-linear relationships between the above conditions and the inclined rigidity $K_I$ of the coupling interface for cylindrical fitting.

* * * * *

UNITED STATES PATENT AND TRADEMARK OFFICE
CERTIFICATE OF CORRECTION

| | |
|---|---|
| PATENT NO. | : 9,304,057 B2 |
| APPLICATION NO. | : 14/237336 |
| DATED | : April 5, 2016 |
| INVENTOR(S) | : Huang et al. |

It is certified that error appears in the above-identified patent and that said Letters Patent is hereby corrected as shown below:

In the claims

Column 13, Line 16, Claim 1:

After "of the test-piece shaft with"
Delete "respected" and
Insert -- respect --.

Column 13, Line 33, Claim 2:

After "is successively cup jointed with"
Delete "the".

Signed and Sealed this
Fifth Day of July, 2016

Michelle K. Lee
*Director of the United States Patent and Trademark Office*